June 19, 1934.     H. C. COVER     1,963,938
METHOD OF MAKING FRUIT ICE CREAM
Filed Dec. 3, 1930     2 Sheets-Sheet 1
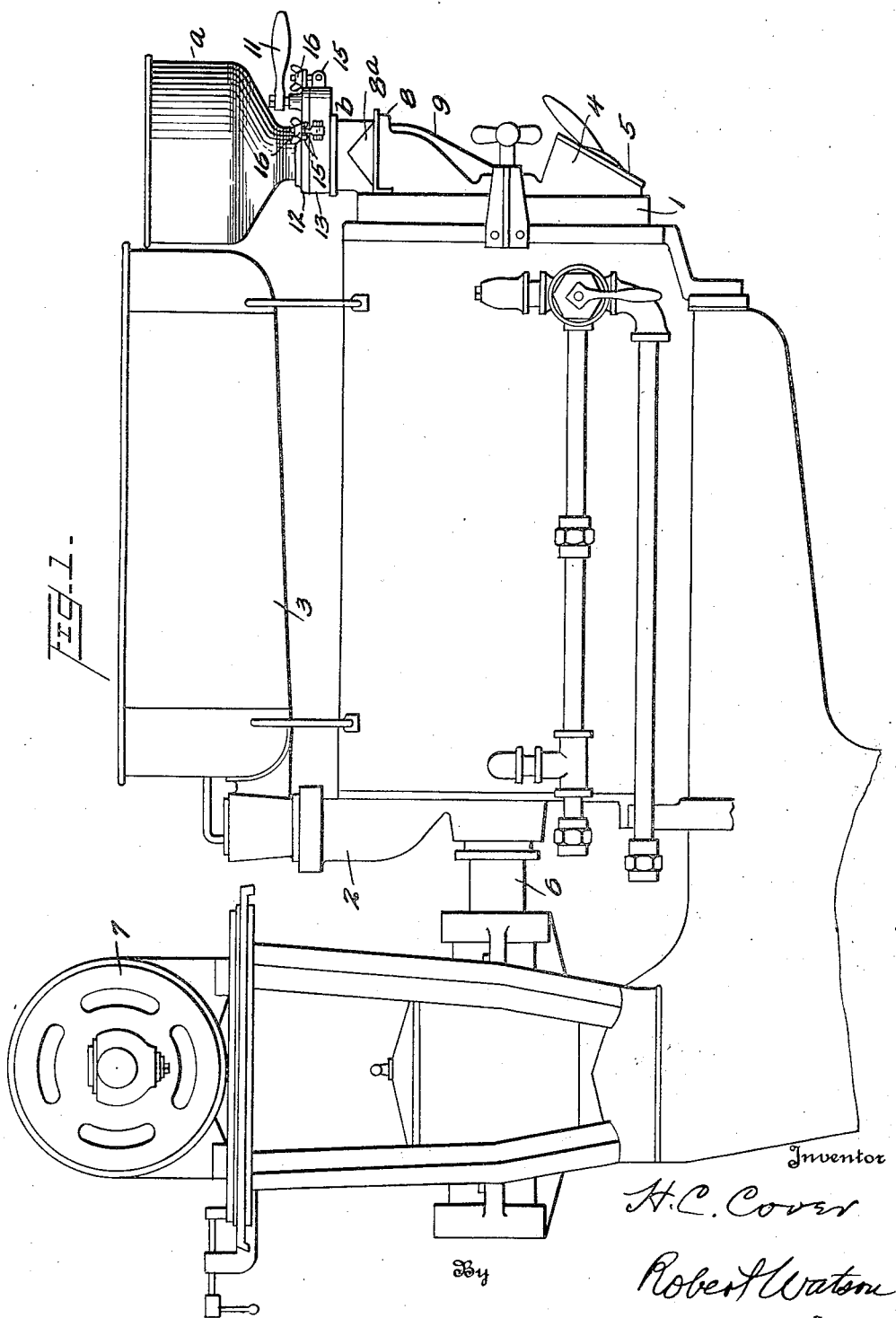

June 19, 1934.　　　　H. C. COVER　　　　1,963,938
METHOD OF MAKING FRUIT ICE CREAM
Filed Dec. 3, 1930　　　　2 Sheets-Sheet 2
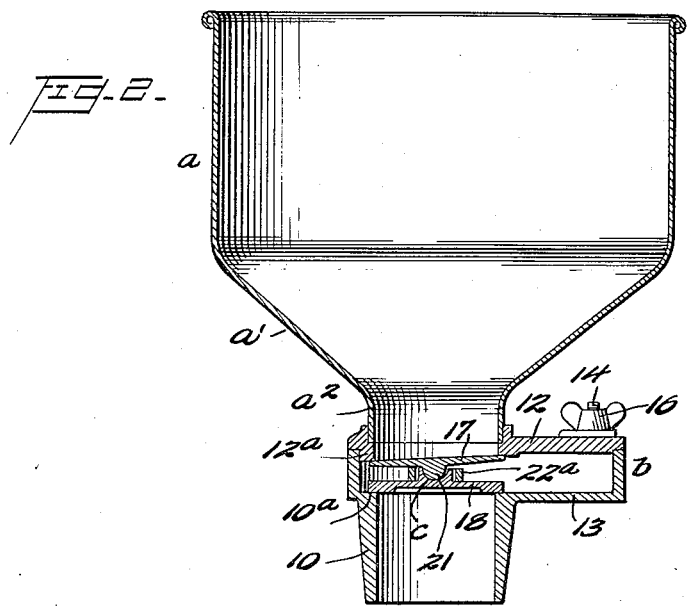
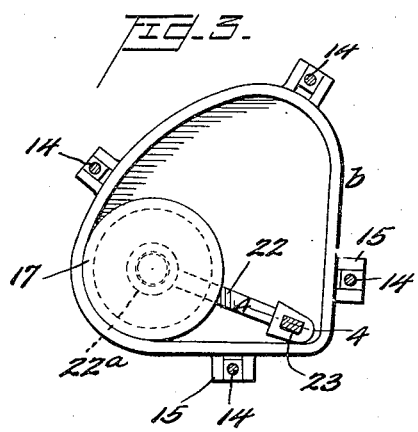
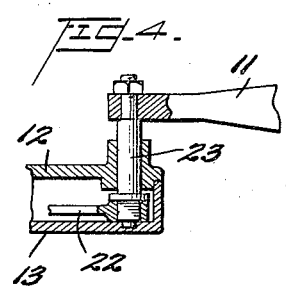
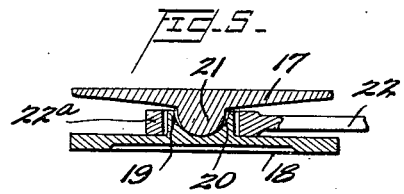
Inventor
H. C. Cover
By
Robert Watson
Attorney Patented June 19, 1934

1,963,938

UNITED STATES PATENT OFFICE 1,963,938

METHOD OF MAKING FRUIT ICE CREAM

Harry C. Cover, Baltimore, Md., assignor of one-half to Lionel Manuel Hendler, Baltimore, Md.

Application December 3, 1930, Serial No. 499,812

2 Claims. (Cl. 99—16)

This invention relates to the commercial manufacture of ice cream, and particularly to a method of introducing fruit into the cream whereby it will appear as whole fruit or lumps in the frozen product. This application is a continuation in part of my application Serial Number 231,381 filed November 5, 1927.

In the manufacture of ice cream on a large commercial scale, the freezers are arranged in banks or batteries, each battery composed of as many units as can be conveniently operated simultaneously, say a dozen or so. The brine circulating around the several freezers in a battery is at the same temperature, say —18° F., and the freezers are all charged at substantially the same time with the batches of cream to be frozen, and in about 6 minutes, when the cream has been frozen to a certain desired consistency, the discharge outlets of the several freezers in the battery are opened at substantially the same time and the frozen product is discharged from the freezers by the scrapers. The freezer cylinders are arranged horizontally and within the cylinders are scrapers which scrape the frozen material from the cylinder walls and usually also operate to impel the material toward the outlet ends of the cylinders, while upon axial shafts beaters are arranged which impel the material toward the inlet ends of the cylinders. These scrapers and beaters are driven from a common power source and operate at the same relatively high speed in all the cylinders. As the batch in each cylinder freezes, while being whipped with the beaters and scrapers, it expands in volume, and at the stage when it should be removed from the freezer it has the consistency of somewhat soft velvety ice cream, requiring further freezing to make it firm and solid. But, if the ice cream is left in the freezers for a brief time after it has been frozen to this stage, it very rapidly undergoes a change, becoming less dense and somewhat icy and losing its smoothness. Therefore, for the best results, and in order to produce ice cream of a soft or velvety nature, the discharge valves of all of the freezers in a battery are opened at the time when the ice cream has attained a certain bulk, and the scrapers discharge the cream into containers in which it is transported to refrigerators for further freezing in a quiescent state.

For convenience in introducing fruit into the ice cream, commercial freezers are usually provided with funnels leading into the freezers through the heads at their outlet ends. Through one of these funnels fruit may be poured or dumped into the batch in a freezer at any time while the batch is in a liquid or semi-liquid state; but as the beaters and scrapers revolve rapidly and a number of minutes must elapse before the cream is frozen to the state at which it should be discharged, the fruit is torn and shredded so that it does not appear as lumps or whole fruit in the frozen product, and commonly the fruit is not visible in the ice cream except on close inspection. During the period while the batches are in a liquid or semi-liquid state, one attendant has ample time in which to dump fruit into the funnels of all of the freezers in a battery, and the fruit will go into the freezers but will be macerated before the batches are frozen.

In order to introduce fruit into the freezers so that it will appear as whole pieces or lumps in the ice cream, it must be introduced immediately before the cream is discharged, say 30 seconds before, so that the fruit will be carried into and mixed with the body of the cream but will not be entirely macerated by the beaters and scrapers before its discharge. The practical difficulty in the way of carrying out this plan heretofore has been that the ice cream upon reaching the stage at which it should be discharged is stiff and crowds out into the base of the funnel, so that fruit poured into the funnel will not force its way into the freezer. It can be forced into the freezer by manual means, but this is impracticable because a number of attendants would be required to pour and force the fruit into a dozen or so freezers, all in the same limited time. Hence the practice has been to pour in the fruit while the batch is in a liquid state and allow it to become macerated.

I overcome these difficulties by placing relatively large hoppers on the upper ends of the fruit funnels, and valves, which may be quickly opened, in the outlets of the hoppers. These valves are closed when the freezers are started into operation and during the 6 minutes or so, while the batches are freezing, an attendant fills the hoppers with the whole fruit or lumps. A substantial weight of fruit is thus stored in the hoppers, ready to be discharge at the desired time by simply throwing open the valves. When the cream attains its proper bulk, the attendant walks along the front of the battery of freezers and opens the valves wide, in succession, and the fruit from each hopper goes down as a solid column and forces its way through the cream at the lower end of the funnel and into the freezer. The attendant then goes back to the first freezer in the battery and again walks along the front of the battery and opens the discharge valves of the freezers in succession. An interval of about 30 seconds takes place between the opening of the fruit valve and the opening of the discharge valve of each freezer, and in this period the fruit is carried into the body of the ice cream and thoroughly mixed therewith by the action of the beaters and scrapers, but is discharged with the cream before being entirely macerated, and before the consistency of the cream has changed, and appears as whole pieces or lumps in the finished product.

The mechanism for carrying out the method is illustrated in the accompanying drawings, in which:

Fig. 1 is a side elevation of an ice cream freezer, a fruit feeding hopper and a release valve attached, the motor for operating a battery of freezers being also shown;

Fig. 2 is a central vertical section through the fruit hopper and valve;

Fig. 3 is a plan view of the lower part of the valve casing, showing the valve therein;

Fig. 4 is a section through part of the valve casing, taken about on the line 4—4 of Fig. 3; and, Fig. 5 is a central transverse section through the valve and the adjacent part of the valve lever.

Referring to Fig. 1 of the drawings, 1 indicates a commercial ice cream freezer, which is horizontally arranged and provided at one end with an inlet pipe or fitting 2, through which the mixture to be frozen is admitted in a measured quantity from a tank 3, arranged above the freezer. Freezers of this general type are illustrated in my Patent No. 1,685,189, dated September 25, 1928 and Thompson Patent No. 1,692,964 dated Nov. 27, 1928. After the batch is frozen to the desired degree, it is discharged from the freezer through an outlet fitting 4, at the opposite end of the freezer, this outlet being controlled by a valve 5. The freezer is provided with scrapers and beaters as usual, and these are operated by a shaft 6. A motor 7 is suitably geared to the shafts of a battery of such freezers. The freezers in a battery are charged simultaneously with the mixture to be frozen, the motor is started and the scrapers and paddles are turned, and after the cream has been frozen to the required degree, the valve 5 of each freezer is opened and the paddles work the frozen batch out through the outlet of the freezer.

As the batch freezes it expands in volume and some of the batch crowds out into a duct 8 on the front wall of the freezer. The condition of the cream may be observed by moving to one side a cap 8a which fits over the top of the duct. For the best results the cream should be discharged from the freezer when it has frozen and expanded to a certain volume, because if it is retained in the freezer and the latter is maintained in operation for only a short time thereafter, the cream becomes light and fluffy and less desirable.

For the purpose of admitting fruit to the freezer a tube or funnel 9 is usually provided on the front head of the freezer and the lower end of this funnel communicates with the interior of the freezer through said head. Fruit may readily be introduced into the freezer by pouring it into the funnel at any time before the batch is frozen, but it will be macerated by the beaters and scrapers before the cream is frozen so that it will not appear as whole fruit or lumps in the final product. When the cream has frozen and expanded to its proper volume some of it crowds out into the base of the funnel and fruit poured into the funnel will not force its way through the frozen cream into the freezer. In order to introduce the fruit after the cream has frozen and attained its proper bulk, I provide a relatively large hopper $a$ which is detachably connected to the tube or funnel 9, and this hopper is adapted to contain a relatively large supply of fruit. The lower part $a'$ of the hopper inclines steeply to the outlet $a2$, so that the fruit will pass freely into and through the outlet in a solid mass when released from the hopper.

Attached to the lower end of the hopper is a valve casing $b$, and extending downwardly from this casing is a short pipe 10, tapering on its outer side and adapted to fit into the tube or funnel 9. A valve $c$, within the casing, is movable by a handle 11 to quickly open the passageway between the hopper and the pipe 10. Fruit, by which term is included nut kernels, is stored in the hopper, and when the cream has been frozen and attained its proper bulk, the operator swings the handle 11 to open the valve and the fruit, in a solid column, by its own weight and momentum, forces its way through the cream at the base of the funnel and into the freezer. The operator walks past the discharge ends of a battery of freezers and opens the valves in succession admitting the fruit to all of the freezers and then opens the discharge valves of the freezers in the same order, so that about 30 seconds elapse between the time of admission of the fruit to a freezer and the time when the discharge valve is opened. During this period, the fruit is carried into and mingled with the cream by the action of the beaters and scrapers, but the cream is discharged from the freezer before the fruit is entirely macerated. After the ice cream has been discharged from the freezers it is taken to refrigerators where it is frozen solid in its expanded state, and whole pieces or lumps of fruit appear in the finished product. The hoppers of a battery of freezers can all be charged with fruit by a single attendant during the early part of the freezing process, and at the critical time when the fruit should be released and the ice cream discharged from the freezer, the one operator can readily release the stored fruit and open all of the discharge valves.

The valve casing $b$ is made in two parts, so that it can be readily taken apart and cleaned. As shown, the upper part 12 of the valve casing is attached to the outlet end $a2$ of the funnel, and the body 13 of the casing is integral with the tubular part 10. The casing projects laterally from the outlet end of the funnel, as shown, and the parts of the casing are held together by screws 14, which are pivotally connected to the body of the casing and adapted to fit between ears 15 on the cover portion. These screws are provided with clamping nuts 16, which are adapted to bear on the cover to clamp the parts together. The valve $c$ comprises disks 17 and 18, the latter having a boss 19 at the center in which is a socket 20, which receives a hemispherical projection 21 on the disk 17. The disks are thus separable and have a ball and socket connection. The valve is movable by a lever 22, which extends between the disks, and has a ringlike end 22a, which fits around the boss 19. This lever is detachably secured to the lower end of a short shaft 23, which latter is pivotally mounted in the cover of the casing and the handle 11 is secured to said shaft. The lower disk 18 slides upon the bottom part of the casing and is adapted to fit against a valve seat 10ª on the tubular part 10. The upper disk 17 is adapted to fit against a valve seat 12ª in the cover, and this valve seat, as shown in Fig. 2, is inclined with respect to the valve seat 10ª. As the valve swings laterally into position to close the passageway, the disk 17 engages the inclined seat 12ª, and as the valve approaches its final position a cam-like action is applied to the valve by the inclined surface of the seat, so that in its final position the valve tightly closes the passageway from the hopper to the tube 10.

It will be seen from the foregoing description that the hopper and attached parts are removable from the freezer, and that the parts composing the valve casing and valve are all separable, which facilitates cleaning. Also, it is to be noticed that the valve can be swung quickly to one side so as to give a clear passageway for the fruit and permit it to drop in a solid column into the cream.

What I claim is:

1. The method of making fruit ice cream in a commercial freezer of the class described, having a fruit inlet at one end, which comprises admitting the batch to be frozen into the freezer, storing a relatively large quantity of fruit in an elevated position above the inlet, freezing the batch until it has expanded in volume and attained the consistency of soft velvety ice cream, then discharging the entire body of fruit suddenly into the inlet to cause it to force its way by its own weight and momentum into the cream, then, after a brief interval, sufficient to permit the fruit to become distributed in the ice cream without complete maceration, and while the cream is substantially at the aforesaid consistency, discharging the cream and incorporated fruit from the freezer.

2. The method of making fruit ice cream in a bank of commercial freezers of the class described, each having a fruit inlet at one end, which comprises charging the freezers simultaneously with the batches to be frozen, storing a relatively large quantity of fruit in an elevated position above the inlet of each freezer while the batches are being frozen, then, after the batches have been frozen to the consistency of soft velvety ice cream, discharging the fruit suddenly into the inlets of the several freezers, in succession, to cause the fruit to force its way by its own weight and momentum into the cream, and then, after a brief interval of time, and while the cream is at the aforesaid consistency, discharging the cream and incorporated fruit from the freezers in succession.

HARRY C. COVER.